SEARCH ROOM
Nov. 7, 1950 F. B. WOODWORTH ET AL 2,528,632
FREQUENCY CONTROL SYSTEM
Filed March 13, 1947
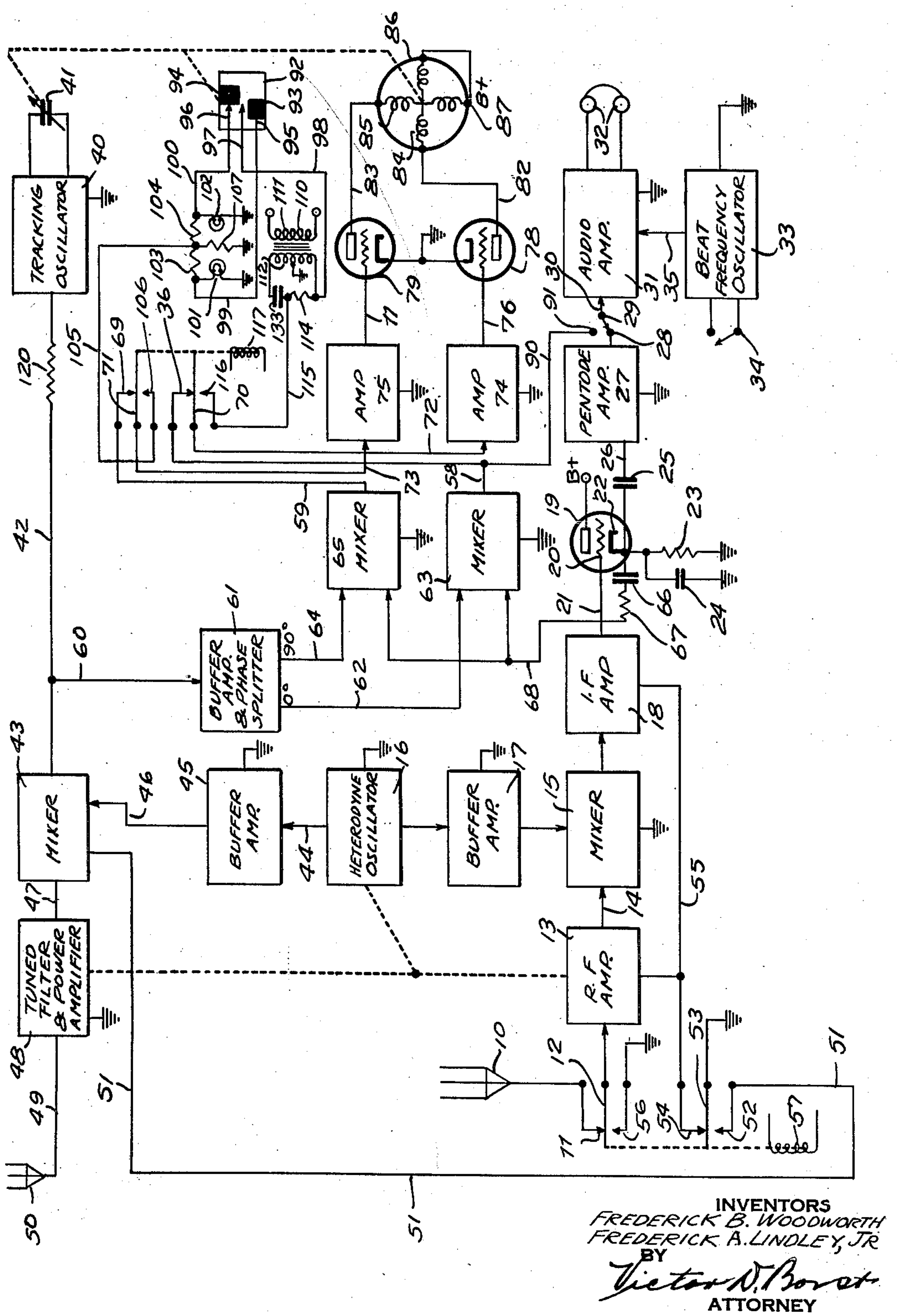
INVENTORS
FREDERICK B. WOODWORTH
FREDERICK A. LINDLEY, JR.
BY
Victor D. Borst
ATTORNEY

SEARCH ROOM

Patented Nov. 7, 1950

2,528,632

UNITED STATES PATENT OFFICE 2,528,632

FREQUENCY CONTROL SYSTEM

Frederick B. Woodworth, Hempstead, and Frederick A. Lindley, Jr., Flushing, N. Y., assignors to Smith-Meeker Engineering Co., New York, N. Y., a corporation of New York Application March 13, 1947, Serial No. 734,346

14 Claims. (Cl. 250—17)

This invention relates to a jamming system for jamming an enemy signal and more particularly to a system involving a local transmitter which is capable of automatically tracking the frequency of the enemy signal with a high degree of accuracy.

An object of the invention is to provide a system of the above type which is stable and dependable in operation and in which the problems of shielding are reduced to a minimum.

Various other objects and advantages will be apparent as the nature of the invention is more fully disclosed.

In accordance with the present invention, a local receiver of the superheterodyne type is employed having the usual tuning means for adjusting the radio frequency channel and the heterodyne oscillator. The transmitter involves a local oscillator set to operate at the intermediate frequency of the receiver and automatically controlled by a tracking motor so as to maintain the oscillator at the intermediate frequency of the received signal within a small degree of error, such for example as plus or minus ten cycles. A signal from the heterodyne oscillator is combined with the signal from the local oscillator to produce a carrier which coincides in frequency with the received carrier. Keying means is provided for alternately transmitting the locally generated carrier and receiving the enemy carrier.

In the above system, the automatic tracking means causes the local oscillator to follow any variation or drift in the received carrier. The local oscillator is normally designed to generate the intermediate frequency when its control element is set in a mid-position. During the operation the control element is shifted from its mid-position by the amount required to correct for differences between the received intermediate frequency and the frequency of the local oscillator. Signal means is provided to indicate when the control element has been shifted from its mid-position by a predetermined amount so that the operator may then return the receiver so as to again bring the control element back to its mid-position.

In accordance with the present invention, the system is so designed that keying of the local carrier does not affect the tuning of the various elements or the operation of the local oscillator. This is accomplished by supplying the energy from the local oscillator and from the heterodyne oscillator to a mixer tube which feeds a power amplifier connected to the transmitter antenna. The keying circuit is arranged to render the mixer tube inoperative during the off or receiving periods, thereby preventing the transmission of any signal to the transmitter antenna or the generation of any signal of carrier frequency during such periods. However, the keying of the mixer tube does not appreciably vary the load on the local oscillator and does not react to vary the tuning thereof.

A feature of the above system resides in the use of two local oscillators, namely the intermediate frequency oscillator and the heterodyne oscillator, neither of which is operating at the carrier frequency. Consequently, neither oscillator in itself produces a signal which interferes with the reception of the enemy carrier and the shielding problem is greatly simplified. Furthermore, the local oscillator is required to operate only at a substantially constant frequency regardless of the frequency of the carrier which is to be emitted. Hence the stability of the oscillator is improved and the tracking problems are greatly simplified. Furthermore, the correction voltages are produced at the intermediate frequency of the receiver which is a comparatively low frequency and can be applied efficiently to a tracking motor.

Another feature of the invention resides in the provision of a tracking motor which is automatically damped to prevent overrun or hunting. This is accomplished by utilizing the direct anode current of the tube supplying the tracking motor to produce a magnetic drag on the motor itself.

The system also provides an automatic reset mechanism for the control element of the local oscillator which, when energized, causes the tracking motor to return the control element to its original mid-position. The resetting means also provides a tuning indication which indicates to which side of correct tuning the received frequency or the receiver itself may have drifted. Also the tuning indicator gives an indication when the control element has reached its extreme positions.

Various other features and advantages of the system will be apparent as the nature of the invention is more fully disclosed.

Although the novel features which are believed to be characteristic of this invention are pointed out more particularly in the claims appended hereto, the nature of the invention will be better understood by referring to the following description taken in connection with the accompanying drawings in which a specific embodiment thereof has been set forth for purposes of illustration.

In the drawings the figure is a schematic diagram of a system embodying the present invention.

Referring to the drawings more in detail, the receiver unit is shown as comprising a receiving antenna 10 which may be of any standard construction, connected through a contact 11 of a switch 12 to a radio frequency amplifier 13. This amplifier and the other elements of the circuit which are shown by blocks are of standard construction and are accordingly not set forth in detail. It is to be understood that the radio frequency amplifier includes the usual tuning elements and amplifier stages. The amplifier 13 is shown as connected by a line 14 to a converter or mixer 15 which comprises the usual converter tube and associated circuits. A heterodyne oscillator 16 is connected through a buffer amplifier 17 to the mixer 15. The buffer amplifier 17 is of any standard type and is adapted to supply oscillations from the oscillator 15 to the mixer 15 without permitting reverse reaction from the receiver circuit to the oscillator.

The intermediate frequency signal derived from the mixer 15 is fed to the usual intermediate frequency amplifier 18 and thence to the input circuit of a detector 19.

Detector 19 is of the infinite impedance input type and is shown as provided with a grid 20 which is connected by a line 21 to the output of the intermediate frequency amplifier 18 and with a cathode 22 which is grounded through a resistor 23 by-passed by a condenser 24. The audio frequency is taken from the cathode end of the resistor 23 and is fed through a coupling condenser 25 and line 26 to an amplifier 27 which is preferably of a type capable of amplifying the audio frequency signal derived from the detector 19 without providing reverse coupling from the subsequent circuit to the detector. An amplifier embodying a pentode tube is suitable for this purpose. The amplifier 27 is connected to contact 28 of a switch 29 and by a lead 30 to an audio amplifier 31 the output of which feeds to a suitable indicator shown as head phones 32. A beat frequency oscillator 33 controlled by a switch 34 is connected by a line 35 to supply a beat frequency to the audio amplifier 31 when continuous waves are being received. For phone signals the beat frequency amplifier will not be required. For standard continuous wave code reception, however, the beat frequency amplifier will be used in the usual manner.

The transmitter section includes a tracking oscillator 40 having a frequency control element 41. The oscillator 40 is so designed that, with the control element 41 set at a mid-position, the oscillator generates a voltage having a frequency corresponding to the normal intermediate frequency of the receiver.

The output of the oscillator 40 is fed by line 42 to a mixer stage 43, which may be of standard construction employing a multi-grid mixer tube. Energy is also fed from the heterodyne oscillator 16 by a line 44 to a buffer amplifier 45 which serves to isolate the oscillator 16, thence by a line 46 to the mixer stage 43, wherein the energy from the oscillator 16 is combined with the energy from the oscillator 40 when the mixer stage 43 is in operative condition. The output from the mixer stage 43 is fed by a line 47 to a filter and power amplifier 48 which may be of standard construction and the output of which feeds by a line 49 to a transmitting antenna 50.

The mixer stage 43 is connected to ground by a line 51 and contact 52 of a keying switch 53. The other contact 54 of the keying switch 53 is connected by a line 55 to the radio frequency amplifier 13 and intermediate frequency amplifier 18 of the receiver. The lines 51 and 55 may be connected to the cathode circuits of the respective tubes so that the respective amplifiers and mixer tubes are rendered operative only when the ground circuit is completed. In this way the mixer stage 43 is inoperative when the contact 54 is closed and the receiver amplifiers 13 and 18 are inoperative when the contact 52 is closed, thereby providing the usual break-in system.

In order to further isolate the receiver when the transmitter is in operation, the contact 56 of the switch 12 is connected to ground and the switches 12 and 53 are interconnected for operation by a suitable relay indicated as a coil 57 so that the receiver is both disconnected from its antenna and grounded during the transmitting periods. However, only the mixer stage 43 and subsequent circuits of the transmitter channel are rendered inoperative during the receiving periods.

The heterodyne oscillator 16 and the tuned circuits of the radio frequency amplifier 13 of the receiver and of the filter and amplifier 48 of the transmitter are ganged together to operate in unison so that a single control is used for tuning the receiver to the incoming signal and for tuning the output filter and amplifier of the transmitter to pass the same carrier frequency.

In the operation of the portion of the circuit thus far described, the receiver is operated in the usual manner and is tuned by tuning the oscillator 16 to a desired incoming signal which is received in the head phones 32. For a phone signal the beat frequency oscillator 33 may be de-energized. For a C-W signal, however, the beat frequency oscillator 33 may be used to produce the usual beat note in the head phones 32. Inasmuch as the same oscillator feeds both the receiver and the mixer stage 43 of the transmitter and the oscillator 40 of the transmitter is designed to operate at the intermediate frequency of the receiver, the mixer stage 43 produces a carrier which is of the same frequency as the carrier to which the receiver is tuned.

The tracking mechanism for bringing these carriers into agreement with a high degree of accuracy will now be described: A portion of the output of the oscillator 40 is fed by a line 60 to a buffer amplifier and phase shifting network 61, the amplifier being designed to prevent reaction on the oscillator 40 due to any variations in the subsequent circuits. The phase shifter is designed to produce two output voltages having a 90° phase difference. One voltage is supplied by a line 62 to a mixer stage 63, the other voltage which differs from that on the line 62 by 90° is fed by a line 64 to a mixer stage 65. An intermediate frequency voltage from the input of the detector 19 of the receiver is taken from the cathode side of the resistor 23 through a condenser 66, a resistance 67 and line 68 to both mixer stages 63 and 65, so that the intermediate frequency from the amplifier 18 is compared with the oscillator frequency of the oscillator 40 in the mixers 63 and 65 to produce beat notes in the output circuits of said mixers. The two beat notes produced in the outputs of the two mixers 63 and 65 are of the same frequency, but differ in phase by 90°.

SEARCH ROOM

By taking the intermediate frequency voltage from the low impedance point at the cathode of the detector 19 any voltages due to the oscillator 40 are prevented from being fed back and entering the intermediate frequency amplifier 18.

The outputs of the mixers 63 and 65 are fed by lines 58 and 59 respectively to contacts 36 and 69 of switches 70 and 71 which are connected respectively by lines 72 and 73 to amplifiers 74 and 75 when the switches 70 ano 71 are in position to close their respective contacts 36 and 69.

The amplifiers 74 and 75 are connected by lines 76 and 77 to the respective grids of tubes 78 and 79. The plates of tubes 78 and 79 are connected by lines 82 and 83 to the quadrature windings 84 and 85 respectively of a standard two-phase induction motor of the type which is preferably provided with a cylindrical aluminum rotor indicated at 86 in which eddy currents are induced to produce a torque which is dependent upon the phase angle between the voltages supplied to the two windings. The two windings 84 and 85 are connected to a common source of plate potential 87 which supplies the plate current for the tubes 78 and 79. In this way the direct current supplied to the plates of the tubes 78 and 79 is caused to flow through the two windings 84 and 85 for producing a magnetic drag on the rotor 86 which is suited to prevent the motor from overrunning or hunting. It is to be understood of course that the tubes 78 and 79 may be of the multi-grid type and include the usual control circuits which are well known in the art. Only so much of the circuit has been shown as is necessary to an understanding of the present invention.

The rotor 86 is indicated as connected to drive the control element 41 of the oscillator 40 and the connection is such that the rotor tends to drive the control element in a direction suited to maintain zero beat in the mixers 63 and 65. It has been found in practice that the beat frequency is automatically maintained by the rotor 86 at a value not exceeding zero plus or minus ten cycles. The accuracy of synchronization of the system with the incoming carrier is determined by the frequency characteristics of the amplifiers 74 and 75 and by the low frequency characteristics of the tracking motor.

In order to provide an audible check on the beat frequency, the output line 58 of the mixer 63 is connected by a line 90 to a contact 91 of the switch 29 so that when the switch 29 is thrown into position to close the contact 91, the audio amplifier 31 receives the beat frequency from the output of the mixer 63.

The rotor 86 of the tracking motor is also ganged to a commutator 92 having insulating segments 93 and 94 engaged by brushes 95 and 96 respectively and a brush 97 is connected to a feed line 98. The brushes 95 and 96 are connected by lines 99 and 100 to indicators 101 and 102 respectively which may comprise glow lamps or small incandescent lights of the same or different colors. The leads 99 and 100 are also connected through resistors 103 and 104 to a line 105 leading to a contact 106 of the switch 71. The mid-point of the resistors 103 and 104 is shown as grounded through a resistor 107.

A transformer 110 is shown as provided with a primary 111 which may be connected to a suitable source of alternating current and with a secondary 112 across which a condenser 113 and resistor 114 are connected in series. The mid-point of the secondary 112 is shown as grounded. One side of the secondary 112 is connected to the feed line 98. Connection is taken from the junction of the condenser 113 and resistor 114 by a line 115 to a contact 116 of the switch 70. Resistor 114 and condenser 113 are so chosen that the voltage at their juncture on line 115 is 90° displaced in phase with respect to the voltage on line 98. The switches 70 and 71 are ganged to operate together by means of a suitable relay indicated as a coil 117.

In the operation of the tracking system, when the switch contacts 36 and 69 are closed, the output of the mixers 63 and 65 are connected directly to the amplifiers 74 and 75 and thence through the tubes 78 and 79 to the quadrature windings 84 and 85 of the tracking motor and serve to actuate the rotor 86 thereof so as to drive the control element 41 of the oscillator 40 to a zero beat position.

Insulating segments 93 and 94 are so designed that when the member 41 is in its mid-position both brushes 95 and 96 are on the insulated portions of the commutator and neither of the indicators 101 or 102 is lighted. However, when the member 41 has been shifted from its mid-position in excess of a predetermined amount, the brush 95 or the brush 96 makes contact with the conducting segment depending upon the direction of rotation, and thereby supplies energizing current to the indicator 101 or 102 from the secondary of the transformer 110. The indicator then gives a visual indication that the control element has been moved an excessive amount in one direction or the other and thereby enables the operator to correct the tuning of the receiver so as to return the control element to its mid-position in which both of the indicators 101 and 102 are extinguished. When the control element 41 has been shifted in excess of the limit of its useful range, the commutator is designed so that contact is made with both brushes 94 and 95 and both of the lights 101 and 102 become lighted. When this occurs it is an indication that the tracking oscillator has been driven beyond its useful range and the device must be reset.

When the switches 70 and 71 are in their lower position with contacts 106 and 116 closed, energy is supplied to the amplifiers 74 and 75 from the leads 115 and 105 respectively. Hence 90° components of the secondary voltage of the transformer 110 is supplied to the amplifiers 74 and 75. This will cause rotation of the rotor 86 in one direction until both of the brushes 94 and 95 have again broken contact with the commutator and rest on the insulation thereby interrupting the excitation to the channel including the amplifier 75. Hence actuation of the relay 117 which controls the switches 70 and 71 causes the tracking motor to automatically reset the control element 41 to its mid-position regardless of the position of the member when the relay 117 is closed and regardless of the incoming signals.

In normal operation the switch 29 may be closed to the contact 28 to permit the operator to scan the band of wave lengths in which he is interested. However, when he has decided upon a given signal to be jammed, the switch 29 may be shifted to close the contact 91 so that the operator can listen to the beat note between the intermediate frequency of the received carrier and the oscillator 40. While listening to this beat note, the switches 70 and 71 will be held in their reset position so that the control element 41 is fixed in its mid-position. The desired signal is then tuned in by the receiver tuning means until the beat note is brought down to its minimum frequency. The reset switch is then actuated to connect the mixers 63 and 65 to the output of the oscillator 40. The tracking motor then takes over and drives the control member 41 to a zero beat position. This may be noted by the disappearance of the beat signal in the head phones 32 as soon as the reset switch has been shifted. The transmitter is now ready for jamming and when the key is depressed to actuate the switches 12 and 53 the jamming signal will be transmitted. The signal may be keyed manually or automatically and it will be noted that during the receiving period the tracking motor will automatically operate to maintain the oscillator 40 at the correct frequency. The local signal accordingly follows any drift or changes in the received carrier and will be maintained thereon as long as the carrier is being received and remains within range of the apparatus.

If the carrier should drift an amount such that one of the lights 101 or 102 becomes lighted, the operator should correct the tuning of the receiver so as to return the control member 41 and the commutator 76 to the mid-position at which both of the lights are extinguished. If on the other hand both of the lights 101 and 102 should become illuminated, it would indicate that the received carrier has drifted beyond the range of automatic correction. In that event the reset switch should be actuated to return the member 41 to its mid-position and the receiver should be re-tuned as in the beginning.

It is to be noted that the plate current passing through the quadrature windings 84 and 85 produces a steady D. C. flux which acts as a drag on the rotor 86 to dampen the movement thereof and to prevent hunting and over control.

The arrangement is such that the exciter mixer is keyed in the cathode circuit. This has the advantage that the keying does not disturb the tunning of either oscillator. Hence the frequency device remains stable regardless of the keying operation.

The local oscillator may be isolated by a resistance 120 in its output circuit which further prevents any reaction thereon due to the remaining circuits. Preferably the mixer 43 comprises a multiple grid tube in which the signal from the heterodyne oscillator 16 is applied to the first grid and the intermediate frequency oscillation from the oscillator 40 is applied to the third grid so as to generate a minimum of harmonics.

The buffer amplifiers 17 and 45 should of course be broad band amplifiers suited to amplify frequencies over the entire frequency range of the heterodyne oscillator 16. The various buffer amplifiers are preferably pentodes inasmuch as this type of amplifier has a small plate-to-grid capacity and produces a minimum reverse coupling.

The detector 19 has been shown as of the infinite impedance type with the output taken from a low impedance point so that reaction from either the audio frequency output or the intermediate frequency output on the grid circuit of the detector is minimized.

It is also to be noted that by keying on the mixer 43 no carrier frequency is produced in the transmitter except when the carrier is being transmitted. Hence during the receiving period there is no locally generated voltage of carrier frequency which would tend to interfere with the operation of the receiver.

The heterodyne oscillator 16 may be set to operate at an intermediate frequency above or below the frequency of the received carrier as desired. The system of course could be kept in continuous operation provided the received signal is maintained separate from the transmitted signal as by the use of directive antennae. Otherwise, if the transmitted signal actuates the receiver, the system will lock on itself.

The system is also adapted to use for frequency control of a sub-station operating with a main station of known frequency which is assigned to the same wave length. In this event the main station would be accurately kept on frequency as by a crystal control and the remote station or sub-station would automatically maintain the same frequency, correcting itself whenever the main station comes on the air. The same system may be applied to a network involving a central station and a plurality of remote stations all operating on the same frequency and eliminates the necessity for accurate frequency control equipment at the remote station as the entire network will be automatically kept on the frequency of the main station.

Although a specific embodiment of the invention has been set forth for purposes of illustration, it is to be understood that the invention is capable of various uses and that changes and adaptations may be made therein as will be readily apparent to a person skilled in the art. The invention is only to be restricted in accordance with the scope of the following claims.

What is claimed is:

1. A self-tracking jamming system for radio carriers, comprising a superheterodyne receiver having a heterodyne oscillator and an intermediate frequency amplifier, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, and means responsive to energy from said intermediate frequency amplifier and energy from said local oscillator to actuate said adjustable frequency control element so as to maintain said local oscillator in substantial synchronism with said intermediate frequency.

2. A self-tracking jamming system for radio carriers, comprising a superheterodyne receiver having a heterodyne oscillator and an intermediate frequency amplifier, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, a tracking motor connected to drive said adjustable frequency control element and combining means energizing said tracking motor in accordance with the combined effect of the energy from said local oscillator and the energy from said intermediate frequency amplifier.

3. A self-tracking jamming system for radio carriers, comprising a superheterodyne receiver having a heterodyne oscillator and an intermediate frequency amplifier, a local oscillator operating at said intermediate frequency and hav-

SEARCH ROOM ing an adjustable frequency control element, mixer means to combine the oscillations from said last oscillator with oscillations from said heterodyne oscillator to obtain a carrier frequency output corresponding to the frequency of the received carrier, a tracking motor connected to drive said adjustable frequency control element, a pair of channels connected to actuate said motor, means supplying a voltage from said intermediate frequency amplifier to each of said channels, means supplying a voltage from said local oscillator to each of said channels, means shifting the phase of one of said voltages in one of said channels by about 90°, and means in each channel to derive the beat frequency of said voltages and to supply the same to said motor in a sense to drive said adjustable frequency control element to zero beat position.

4. A self-tracking jamming system for radio carriers, comprising a superheterodyne receiver having a heterodyne oscillator and an intermediate frequency amplifier, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, a tracking motor connected to drive said adjustable frequency control element, a pair of channels connected to actuate said motor, means supplying a voltage from said intermediate frequency amplifier to each of said channels, means supplying a voltage from said local oscillator to each of said channels, means shifting the phase of said last voltage in one of said channels by about 90°, and means in each channel to derive the beat frequency of said voltages and to supply the same to said motor in a sense to drive said adjustable frequency control element to zero beat position.

5. A self-tracking jamming system for radio carriers, comprising a superheterodyne receiver having a heterodyne oscillator and an intermediate frequency amplifier, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, a tracking motor of the two phase eddy current induction type having a pair of quadrature windings and a rotor connected to drive said adjustable frequency control element, a pair of channels connected to the respective windings of said motor, means supplying a voltage from said intermediate frequency amplifier to each of said channels, means supplying a voltage from said local oscillator to each of said channels, means shifting the phase of one of said voltages in one of said channels by about 90°, and means in each channel to derive the beat frequency of said voltages and to supply the same to said motor in a sense to drive said adjustable frequency control element to zero beat position, each channel including at least one vacuum tube having an anode and means supplying D. C. voltage to said anodes in series with said windings to produce a magnetic drag on said rotor.

6. In combination with a two-phase eddy current induction motor having a pair of windings and a rotor driven by eddy currents induced by said windings, a supply channel connected to energize each of said windings and including a vacuum tube having an anode, and an anode potential circuit for each anode including said winding in series therewith to produce a steady D. C. flux in said rotor to act as a magnetic drag thereon.

7. A self-tracking jamming system for radio carriers, comprising a superheterodyne receiver having a heterodyne oscillator and an intermediate frequency amplifier, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, means responsive to energy from said intermediate frequency amplifier and energy from said local oscillator to actuate said adjustable frequency control element so as to maintain said local oscillator in substantial synchronism with said intermediate frequency, and means keying said mixer means to control the formation of the carrier frequency therein.

8. A self-tracking jamming system for radio carriers, comprising a superheterodyne receiver having a heterodyne oscillator and an intermediate frequency amplifier, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, means responsive to energy from said intermediate frequency amplifier and energy from said local oscillator to actuate said adjustable frequency control element so as to maintain said local oscillator in substantial synchronism with said intermediate frequency and break in means to key alternately said receiver and said mixer means whereby carrier frequency is not produced in said mixer means during receiving periods.

9. A self-tracking jamming system for radio carriers, comprising a superheterodyne receiver having a heterodyne oscillator and an intermediate frequency amplifier, a local oscillator operating at said intermediate frequency and having an adjustable frequency control element having a mid-position, mixer means to combine the oscillations from said last oscillator with oscillations from said heterodyne oscillator to obtain a carrier frequency output corresponding to the frequency of the received carrier, a tracking motor connected to drive said adjustable frequency control element and combining means energizing said tracking motor in accordance with the combined effect of the energy from said local oscillator and the energy from said intermediate frequency amplifier, a reset circuit for said tracking motor having means to return said adjustable frequency control element to a mid-position, and reset means to disconnect said tracking motor from said first energizing means and to connect said tracking motor to said reset circuit.

10. A self-tracking jamming system for radio carriers, comprising a superheterodyne receiver having a heterodyne oscillator and an intermediate frequency amplifier, a local oscillator operating at said intermediate frequency and having an adjustable frequency control element having a range of movement, mixer means to combine the oscillations from said last oscillator with oscillations from said heterodyne oscillator to obtain a carrier frequency output corresponding to the frequency of the received carrier, a tracking motor connected to drive said adjustable frequency control element, combining means energizing said tracking motor in accordance with the combined effect of the energy from said local oscillator and the energy from said intermediate frequency amplifier, and signal means connected to respond selectively to a tracking movement beyond a predetermined range from a mid-position in either direction.

11. A self-tracking jamming system for radio carriers, comprising a superheterodyne receiver having a heterodyne oscillator and an intermediate frequency amplifier, a local oscillator operating at said intermediate frequency and having an adjustable frequency control element having a range of movement, mixer means to combine the oscillations from said last oscillator with oscillations from said heterodyne oscillator to obtain a carrier frequency output corresponding to the frequency of the received carrier, a tracking motor connected to drive said adjustable frequency control element, combining means energizing said tracking motor in accordance with the combined effect of the energy from said local oscillator and the energy from said intermediate frequency amplifier, and signal means connected to respond selectively to a tracking movement beyond a predetermined range from a mid-position in either direction and to respond in unison to a predetermined further range of tracking movement.

12. A self-tracking jamming system for radio carriers, comprising a superheterodyne receiver having a heterodyne oscillator and an intermediate frequency amplifier, a detector, and an audio frequency circuit, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, means responsive to energy from said intermediate frequency amplifier and energy from said local oscillator to produce a beat note to actuate said adjustable frequency control element so as to maintain said local oscillator in substantial synchronism with said intermediate frequency, and means to connect said audio frequency circuit to respond to the output of said detector or to the beat note between said intermediate frequency and said local oscillator.

13. A self-tracking jamming system for radio carriers, comprising a superheterodyne receiver having a heterodyne oscillator and an intermediate frequency amplifier, a detector, and an audio frequency circuit, a local oscillator operating at said intermediate frequency and having an adjustable frequency control element, mixer means to combine the oscillations from said last oscillator with oscillations from said heterodyne oscillator to obtain a carrier frequency output corresponding to the frequency of the received carrier, a tracking motor connected to drive said adjustable frequency control element and combining means energizing said tracking motor in accordance with the combined effect of the energy from said local oscillator and the energy from said intermediate frequency amplifier, said detector being of the infinite impedance type including a vacuum tube having a cathode connected to ground through a low impedance path, and means supplying intermediate frequency energy from said cathode to said combining means.

14. A system as set forth in claim 1 including buffer amplifier means interposed between said heterodyne oscillator and said receiver and said mixer means respectively to isolate said heterodyne oscillator from reaction from the remaining circuit.

FREDERICK B. WOODWORTH.
FREDERICK A. LINDLEY, JR.

REFERENCES CITED

The following references are of record in the file of this patent:

UNITED STATES PATENTS

| Number | Name | Date |
|---|---|---|
| 2,138,042 | Robinson | Nov. 29, 1938 |
| 2,209,273 | Hills | July 23, 1940 |
| 2,304,377 | Roberts | Dec. 8, 1942 |
| 2,317,547 | McRae | Apr. 27, 1943 |
| 2,369,268 | Trevor | Feb. 13, 1945 |
| 2,408,791 | Magnuski | Oct. 8, 1946 |
| 2,419,527 | Bartelink | Apr. 29, 1947 |